(12) United States Patent
Bauer et al.

(10) Patent No.: US 8,234,067 B2
(45) Date of Patent: Jul. 31, 2012

(54) METHODS AND APPARATUS FOR SWARM NAVIGATION OF MULTIPLE AGENTS

(75) Inventors: Peter Bauer, South Bend, IN (US); Matthias Scheutz, South Bend, IN (US)

(73) Assignee: University of Notre Dame du Lac, Norte Dame, IN (US)

( * ) Notice: Subject to any disclaimer, the term of this patent is extended or adjusted under 35 U.S.C. 154(b) by 831 days.

(21) Appl. No.: 12/181,036

(22) Filed: Jul. 28, 2008

(65) Prior Publication Data

US 2009/0099768 A1 Apr. 16, 2009

Related U.S. Application Data

(60) Provisional application No. 60/952,319, filed on Jul. 27, 2007.

(51) Int. Cl.
*G06F 21/00* (2006.01)
*G08G 1/16* (2006.01)

(52) U.S. Cl. .......................... 701/467; 701/301

(58) Field of Classification Search .......... 701/200–202, 701/206–207, 300–302, 96, 400, 467; 340/425.5, 340/903, 435–436
See application file for complete search history.

(56) References Cited

U.S. PATENT DOCUMENTS

| | | | | |
|---|---|---|---|---|
| 3,039,554 A | * | 6/1962 | Hosking et al. | 180/168 |
| 4,345,662 A | * | 8/1982 | Deplante | 180/168 |
| 4,627,511 A | * | 12/1986 | Yajima | 180/167 |
| 4,802,096 A | * | 1/1989 | Hainsworth et al. | 701/301 |
| 6,799,100 B2 | * | 9/2004 | Burns et al. | 701/25 |

OTHER PUBLICATIONS

M. Scheutz, P. Bauer, "A Scalable, Robust, Ultra-Low Complexity Agent Swarm for Area Coverage and Interception Tasks," Computer Aided Control System Design, 2006 IEEE International Conference on Control Applications, 2006 IEEE International Symposium of Intelligent Control, 2006, IEEE, pp. 1258-1263.
D.A. Dewasurendra, P. Bauer, M. Scheutz and K. Premaratne, "Evidence Based Navigation in Swarms," Decision and Control, 2006 45th IEEE Conference on Dec. 13-15, 2006, pp. 5078-5083.
R. Connaughton, P. Schermerhorn, M. Scheutz, "Pbhysical Parameter Optimization in Swarms of Ultra-Low Complexity Agents," In Proceedings of AAMAS (3) 2008, pp. 1631-1634.
M. Scheutz, P. Schermerhorn, P. Bauer, "The Utility of Hetergeneous Swarms of Simple UAVs with Limited Sensory Capacity in Detection and Tracking Tasks," Swarm Intelligence Symposium, 2005, Proceedings 2005 IEEE, pp. 257-264.

(Continued)

*Primary Examiner* — Yonel Beaulieu
(74) *Attorney, Agent, or Firm* — Greenberg Traurig, LLP

(57) ABSTRACT

A swarm navigation system is disclosed. The swarm navigation system includes a plurality of mobile agents, each having a receiver and capable of receiving a collision avoidance signal or a target attraction signal from a remote source. A stereo antenna system and memory storing instructions cause the mobile agent to determine the intensity and direction of the received collision avoidance signal or the received target attraction signal and to navigate the mobile agent substantially towards the received target attraction signal and substantially away from the received collision avoidance signal. Each mobile agent may further include a collision avoidance beacon mounted to the mobile agent and adapted to broadcast a collision avoidance signal, and a target attraction beacon mounted to the mobile agent and adapted to selectively broadcast a target attraction signal.

21 Claims, 6 Drawing Sheets

OTHER PUBLICATIONS

Scheutz, M. and Bauer, P. (2006) "A Scalable, Robust, Ultra-Low Complexity Agent Swarm for Area Coverage and Interception Tasks". Proceedings of ISIC06, 1258-1263.

Dewasurendra, D.A., Bauer, P., Scheutz, M. and Premaratne, K. (2006) "Evidence Based Navigation in Swarms". Proceedings of CDC 2006, 5078-5083.

M. Scheutz, P. Schermerhorn, and P. Bauer, "The utility of heterogeneous swarms of simple UAVs with limited sensory capacity in detection and tracking tasks," in Proceedings of the IEEE Swarm Intelligence Symposium, 2005, pp. 257-264.

Ryan Connaughton, Paul w. Schermerhorn and Matthias Scheutz (2008) "Physical parameter optimization in swarms of ultra-low complexity agents" Proceedings of AAMAS, (3), 1631-1634.

T. Balch and R.C. Arkin. " Behavior based formation control for multi robot teams", IEEE Trans. on Robot. Autom., vol. 14, pp. 926-939, Dec. 1998.

V. Trianni and M. Dorigo "Emergent collective decisions in a swarm of robots" Proceedings of IEEE Swarm Intelligence Symposium, pp. 241-248, 2005.

D. Zarzhitsky and D.F. Spears and W.M. Spears, W.M. "Swarms for chemical plume tracing" Proceedings of IEEE Swarm Intelligence Symposium, pp. 249-256, 2005.

R.W. Deming and L.I. Perlovsky "Sensor fusion for swarms of small unmanned aerial vehicles" Proceedings of IEEE Swarm Intelligence Symposium, pp. 302-308, 2005.

P. Gaudiano and E. Bonabeau and B. Shargel "Evolving behaviors for a swarm of unmanned air vehicles" Proceedings of IEEE Swarm Intelligence Symposium, pp. 317-324, 2005.

Y. Yang, A. Minai, and M. Polycarpou, "Decentralized cooperative search by networked UAVs in an uncertain environment," in Proceedings of the 2004 American Control Conference, 2004, pp. 5558-5563.

A. T. Hayes, A. Martinoli, and R. M. Goodman," Distributed Odor Source Localization," IEEE Sensors, Special Issue on Artificial Olfaction, vol. 2, No. 3, pp. 260-271, 2002. IEEE Press.

Kazadi S., Goodman R., Tsikata D., Lin H., "An Autonomous Water Vapor Plume Tracking Robot Using Passive Resistive Polymer Sensors," Autonomous Robots, vol. 9, No. 2, pp. 175-188, 2000. Kluwer Academic Publishers.

C. W. Reynolds. Flocks, herds, and schools: a distributed behavioral model. Computer Graphics (ACM SIGGRAPH 87 Conference Proceedings), 21(4):25-34, Jul. 1987.

Herbert G. Tanner, "Flocking with Obstacle Avoidance in Switching Networks of Interconnected Vehicles," 2004 IEEE International Conference on Robotics and Automation, New Orleans LA, Apr. 26-May 1, pp. 3006-3011.

Herbert G. Tanner, Ali Jadbabaie and George J. Pappas, "Stable Flocking of Mobile Agents, Part I: Fixed Topology," 42nd IEEE Conference on Decision and Control, Maui Hawaii, Dec. 2003, pp. 2010-2015.

Herbert G. Tanner, Ali Jadbabaie and George J. Pappas, "Stable Flocking of Mobile Agents, Part II: Dynamic Topology," 42th IEEE Conference on Decision and Control, Maui Hawaii, Dec. 2003, pp. 2016-2021.

H.V.D. Parunak and S. Brueckner. "Swarming Coordination of Multiple UAVs for Collaborative Sensing" Proceedings of Second AIAA Unmanned Unlimited Systems, Technologies, and Operations Conference, AIAA, 2003.

* cited by examiner

METHODS AND APPARATUS FOR SWARM NAVIGATION OF MULTIPLE AGENTS

CROSS REFERENCE TO RELATED APPLICATION

This application is a non-provisional application claiming priority from U.S. Provisional Application Ser. No. 60/952,319, filed Jul. 27, 2007, and incorporated herein by reference in its entirety.

FIELD OF THE DISCLOSURE

The present disclosure relates generally to swarm navigation and more particularly, to methods and apparatus for swarm navigation of multiple agents.

BACKGROUND OF RELATED ART

Swarm intelligence is artificial intelligence based on the collective behavior of decentralized, self-organized systems. Swarm intelligence systems are typically made up of a population of simple agents interacting locally with one another and with their environment. The agents follow very simple rules, and although there is no centralized control structure dictating how individual agents should behave, local interactions between such agents lead to the emergence of complex global behavior.

Over the last few years, swarm intelligence has become an interesting alternative to standard centralized and distributed control approaches for solving a variety of multi-agent coordination problems. Some implementations include using only local rules, using "digital pheromones," and using sensor fusion and self-deployment of sensors.

The behavior of local agents employed in a swarm system are typically governed by simple rules, which take the position of neighbors into account. While it is relatively straightforward to obtain the position of neighbors in computer simulations of swarm systems, in a practical, real world situation, positioning information requires particular sensory and functional capabilities, in particular, digital communication. For instance, each agent may require a Global Positioning System (GPS) and digital communication to relay the GPS data to other agents that require the data. In still another example, agents in a swarm system that is based upon "digital pheromones" need to maintain a global map of pheromone positions that is shared among all agents.

DETAILED DESCRIPTION

A novel, ultra-low complexity navigation and resource allocation concept for multiple-agent swarms is described herein. The system is based on simple radio beacons carried by each agent. Different from other systems, the described system may be implemented with relatively simple hardware and does not require the existence of a digital communication network to perform its functions. In general, the disclosed system includes two types of beacons carried by every agent: a target attraction beacon; and a collision avoidance beacon. The collision avoidance beacon is adapted to repel the agents from one another and to distribute them accordingly. In at least one example, the collision avoidance beacon is essentially already active. The target attraction beacon become active only upon detection of a target or waypoint, whatever that target/waypoint may be, and is adapted to attract each agent.

In addition the navigation scheme can be based on essentially any signal modality (or mixes of modalities) that the swarm agents can sense and thus allows to "hunt" for certain signal signatures or mixes of signals that may be of interest. For example, in one instance, longer range radio frequency waypoint beacons are used to bring the swarm into the theatre of operations and then guidance and control is turned over to local signals such as sound, infrared, or other suitable communication device.

Figure 1:
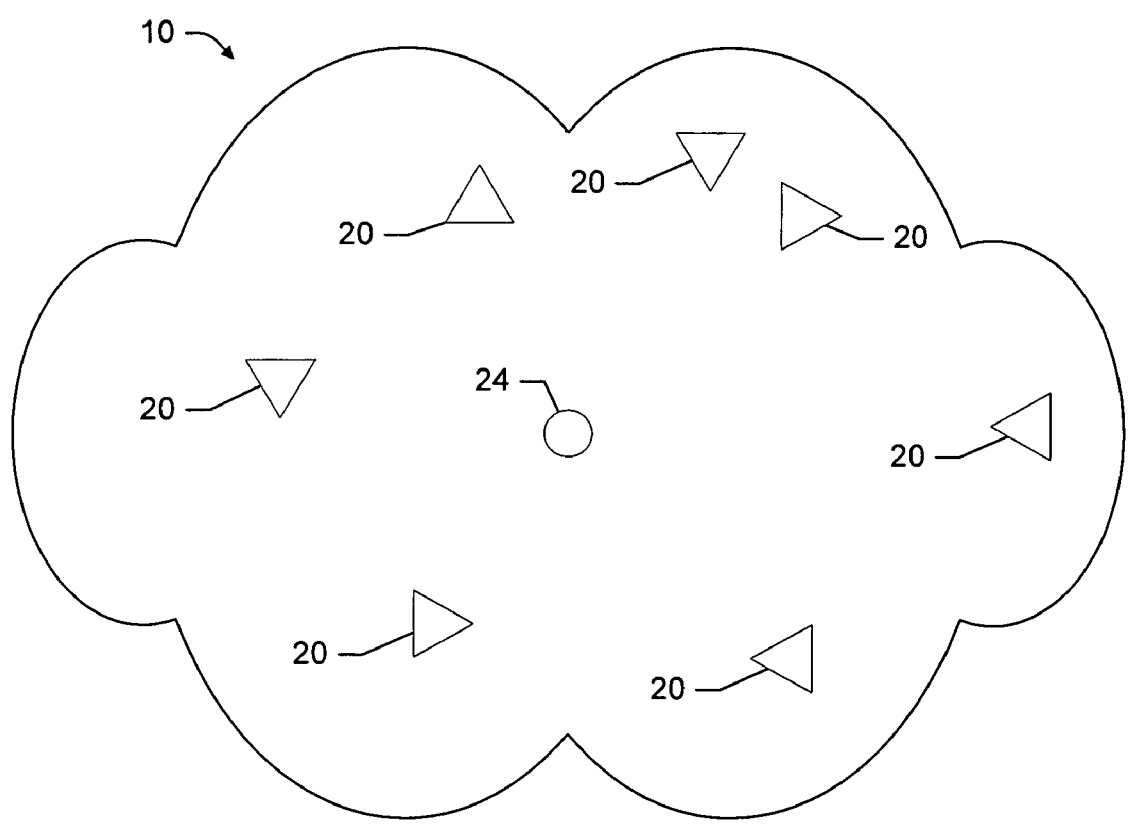
FIG. 1 is an illustration of an example swarm navigation system.

Referring now to FIG. 1, an example of navigation system 10 is disclosed. In the illustrated example, a plurality of mobile units or agents 20 are designed to operate in an operating theatre 22 including a target 24. The agents 20 may be any suitable agent, including, for example, a mobile vehicle such as a VEX mobile robot marketed by Innovation First, Inc., of Greenville, Tex. The example agents 20 are capable of changing direction (i.e., turning) as desired. Some of the agents 20, however, may be stationary (e.g., a waypoint, a stationary beacon, etc.) as will be described below. The example operating theatre 22 may be any size, shape, and/or height. Finally, the target 24 may be any discernable target, having any shape, size, and/or property, and may be isolated and/or integrated into the environment and may contain any number of targets. Furthermore, the target 24 may be stationary, mobile, and/or any combination thereof. In one example, the target 24 is an environmental element, such as, for example, an environmental spill, while in other examples, the target 24 may be a "hard target" such as a military target.

Figure 2:
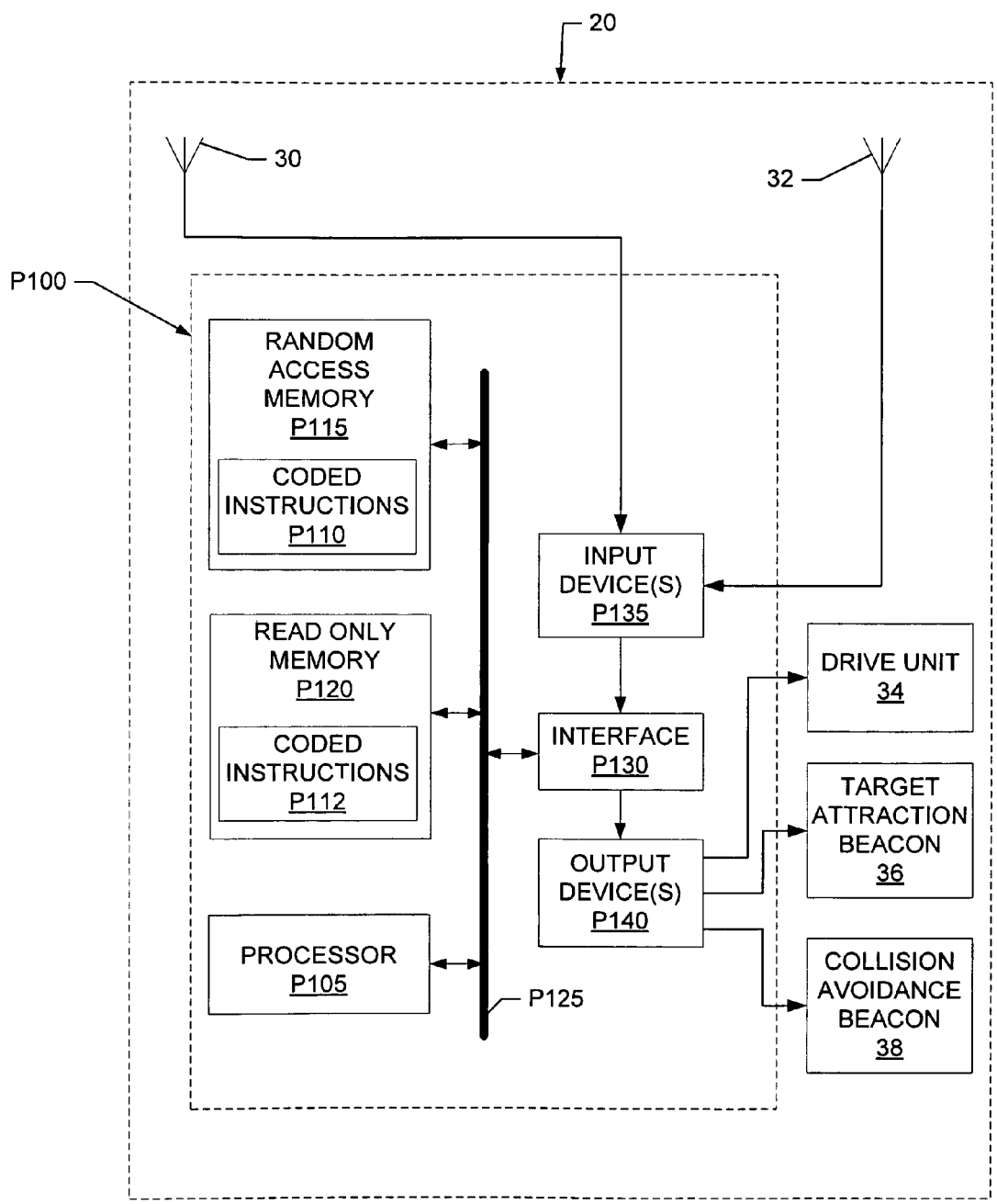
FIG. 2 is a schematic illustration of an example processor platform that may be used and/or programmed to perform any or all of the example machine accessible instructions to implement any or all of the example swarm navigation system of FIG. 1.

FIG. 2 is a schematic illustration of one example manner of implementing the example agent 20 of FIG. 1. FIG. 10 is a schematic diagram of an example processor platform P100 that may be used and/or programmed to implement the example agent 20 disclosed herein. For example, the processor platform P100 can be implemented by one or more general-purpose processors, processor cores, microcontrollers, etc.

The processor platform P100 of the example of FIG. 2 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 3 to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to, for example, implement the example method described herein.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input device(s) P135 may include, for example, a pair of spaced apart directional antenna 30, 32 having directional sensitivity as described below. The example output device(s) P140 may include, for example, a drive unit 34, a target attraction beacon 36, and a collision avoidance beacon 38.

While an example manner of implementing the agent 20 has been illustrated in FIG. 2, one or more of the data structures, elements, processes and/or devices illustrated in FIG. 2 may be combined, divided, re-arranged, omitted, eliminated and/or implemented in any way. Further, the example agent 20 may be implemented by hardware, software, firmware and/or any combination of hardware, software and/or firmware. Further still, the example agent 20 may include data structures, elements, processes and/or devices instead of, or in addition to, those illustrated in FIG. 2 and/or may include more than one of any or all of the illustrated data structures, elements, processes and/or devices. Finally, the example agent 20 may be implemented with an analog scheme.

Figure 3:
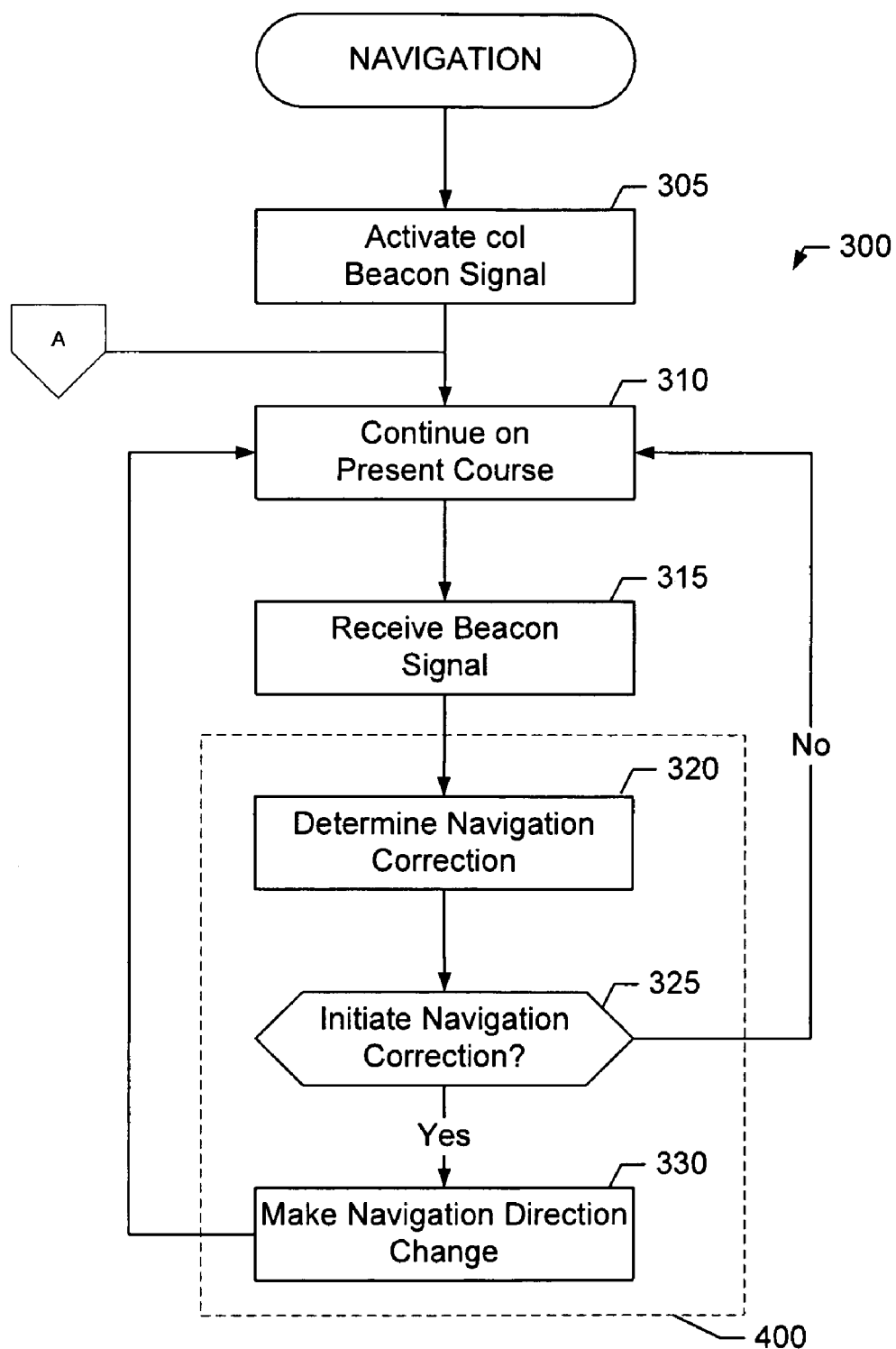
FIG. 3 is a flowchart representative of example process that may be carried out to navigate the example swarm navigation system of FIG. 1

FIG. 3 is a flowchart representative of example process that may be carried out to navigate the example agent 20 and/or, more generally, to implement the example methods described herein. The example process of FIG. 3 may be carried out by a processor, a controller and/or any other suitable processing device. For example, the example process of FIG. 3 may be embodied in coded instructions stored on a tangible medium such as a flash memory, a read-only memory (ROM) and/or random-access memory (RAM) associated with a processor (e.g., the example processor P105 discussed above in connection with FIG. 2). Alternatively, some or all of the example process of FIG. 3 may be implemented using any combination(s) of circuit(s), ASIC(s), PLD(s), FPLD(s), discrete logic, hardware, firmware, etc. Also, some or all of the example process of FIG. 3 may be implemented manually or as any combination of any of the foregoing techniques, for example, any combination of firmware, software, discrete logic and/or hardware. Further, although the example operations of FIG. 3 are described with reference to the flowchart of FIG. 3, many other methods of implementing the operations of FIG. 3 may be employed. For example, the order of execution of the blocks may be changed, and/or one or more of the blocks described may be changed, eliminated, sub-divided, or combined. Additionally, any or all of the example process of FIG. 3 may be carried out sequentially and/or carried out in parallel by, for example, separate processing threads, processors, devices, discrete logic, circuits, etc.

The example process of FIG. 3 begins with the activation of at least two collision avoidance beacons 38 (block 305). In particular, the collision avoidance beacon 38 on the example agent 20 is activated, along with a second remote beacon 38 that may be located either on another agent 20 or on some device such as a stationary object such as, for example, a waypoint. In this example, the collision avoidance beacon 38 is substantially always active. In some examples, the target attraction beacon 36 may also be activated, including, for example, when the agent (e.g., one of the agents 20) detect a target, whatever that target may be. The example collision avoidance beacon 38 and/or the target attraction beacon 36 may be any suitable broadcasting device, such as, for example, electromagnetic, infrared, acoustic, light, or other suitable device. Upon activation of the beacon 36, the agent 20 utilized the drive unit 34 to continue on its present navigational course (e.g., straight ahead) (block 310).

The signals broadcasted by the beacons 36, 38 are detected by the agent 20 utilizing the antenna 30, 32. The antenna 30, 32 detect the signals broadcasted by both the target attraction beacon 36 (if applicable) and the collision avoidance beacon 38 (block 315). Using a simple comparison of the intensity of the received signal strength in both of the antenna 30, 32, simple navigational decisions can be made to allow the agent 20 to either approach or move away from the broadcasting beacon 36, 38 (block 310), as described in further detail below. If the agent 20 determines that a navigational change is required (block 325), a simple navigational course correction, such as, for example, a right or left turn, is made (block 330) and the agent 20 resumes its present course (block 310). If, however, the agent 20 determines that no navigational change is required (block 325) the agent 20 simple continues on its present course (block 310). In essence, navigational decisions are based on a sequence of binary decisions (e.g., turn left/turn right; go up/go down) that are driven by the signals received by the antenna 30, 32.

Figure 4:
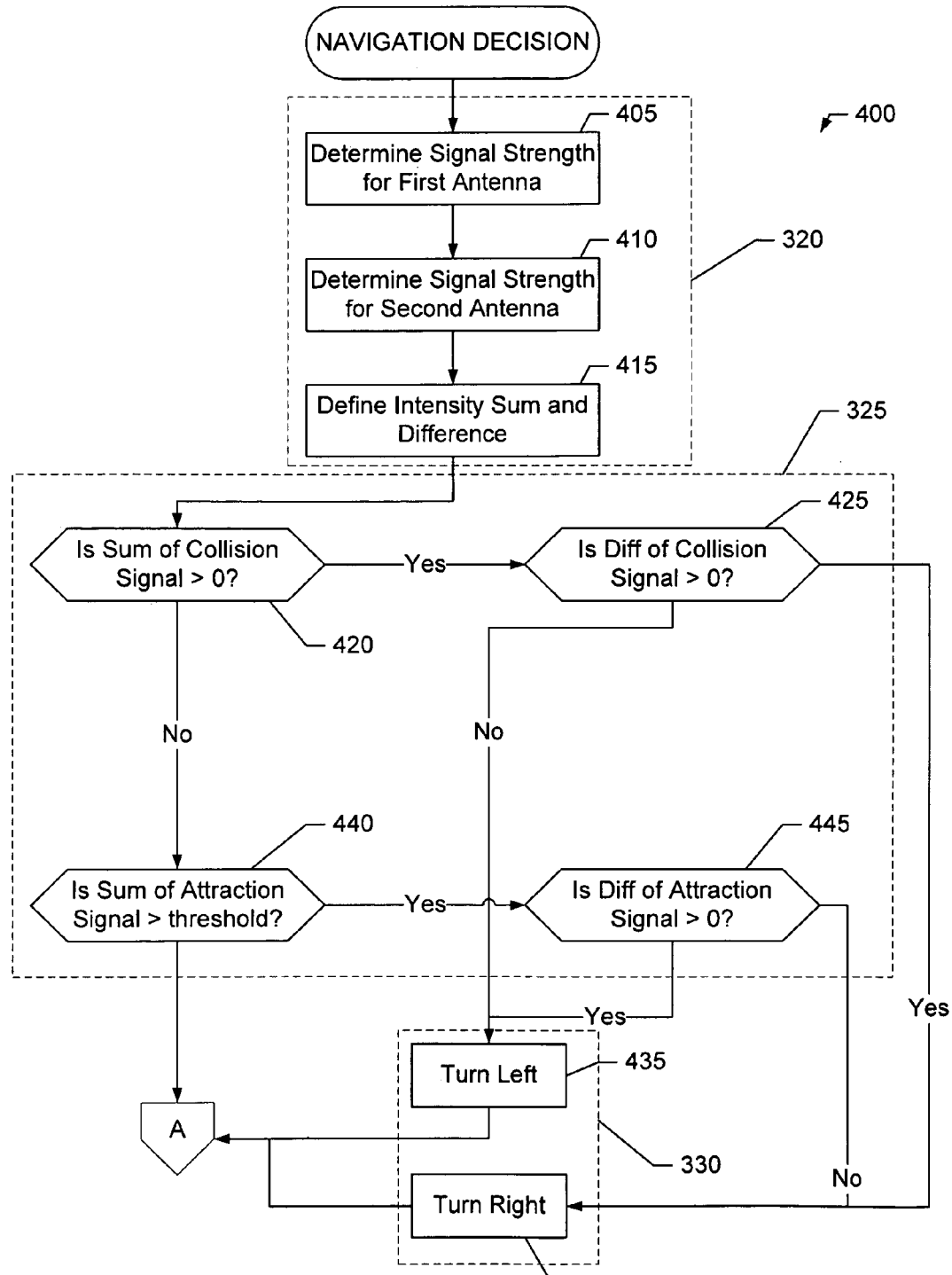
FIG. 4 is a flowchart representative of example navigation correction decision that may be carried out by the example process of FIG. 3.
Figure 5:
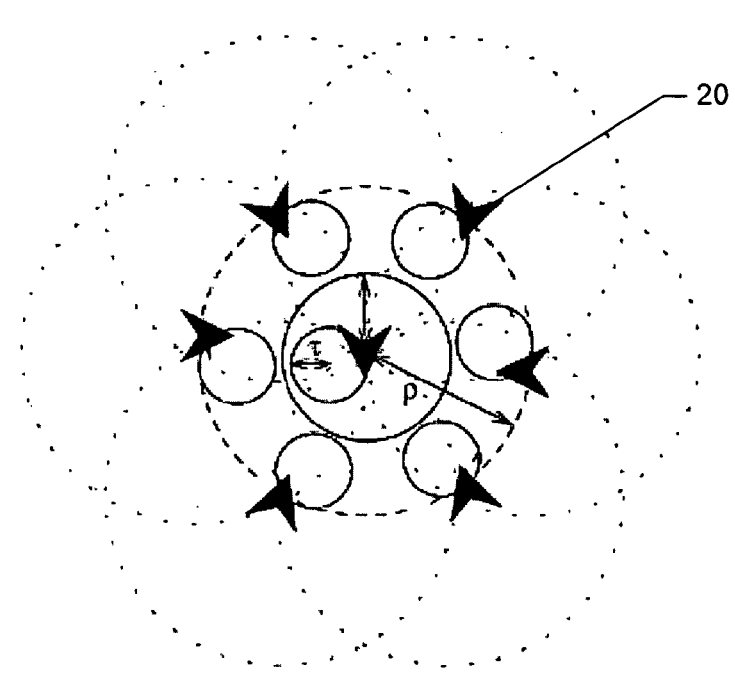
FIG. 5 is an illustration similar to FIG. 1, showing multiple example swarm agents and including a repulsion range and turning radius.

FIG. 4 is a flowchart representative of example navigation correction decision that may be carried out by the method of FIG. 3 (block 400) to navigate the example agent 20. In particular, in this example, the agent 20 processes the signal data received from the antenna 36, 38 to extract the halfplane from which the broadcast signal originated using the received signal strength comparison (block 405, 410). The radius $\rho$ effectively is an agent's collision avoidance range and represents the distance an agent must keep between itself and its neighbors to leave enough space to turn. This radius can be set and determined by the receive signal strength. Therefore, $\rho$ is dependent upon a minimum turning radius $\tau$, which in turn, is typically dependent upon the agent's speed (see FIG. 5).

One example algorithm to determine the beacon distance from the receiver, the example agent 20 uses, is shown in Equation (1) as:

$$I_{y,i} = \sum_{j=1}^{n} A_y / (\|\underline{x_j} - \underline{x_i}\|_2^2) \qquad \text{(Eqn. 1)}$$

In many cases, however, determining the exact beacon location is unnecessary. The quantity $I_{y,i}$ is the received power of the signal from the beacon of type y (i.e., the target attraction beacon 36 ("tar"), or the collision avoidance beacon 38 ("col")) from agent i, at location $x_i$ with y∈{col, tar}, and $A_y$ is the transmit power of the type y beacon 36, 38. In this example, there are a total of n agents 20, and all beacons 36, 38 of the same type have the same power. Using the directional sensitivity of the two antenna 30, 32, the signal intensity for the antennas 30, 32, (i.e., left and right antenna) of each of the two modalities is shown in Equations (2)-(4) as:

$$R_{y,i} = \sum_{j \in \tau_y} A_y f(\underline{x_j} - \underline{x_i}, \underline{\eta_i})/(\|\underline{x_j} - \underline{x_i}\|_2^2) \quad \text{(Eqn. 2)}$$

$$L_{y,i} = \sum_{j \in \tau_y} A_y f(\underline{x_j} - \underline{x_i}, -\underline{\eta_i})/(\|\underline{x_j} - \underline{x_i}\|_2^2) \quad \text{(Eqn. 3)}$$

with $$\Gamma_{col} = \{j \mid \|\underline{x_j} - \underline{x_i}\|_2 < \alpha\}, \Gamma_{tar}\{1, K, n\} \quad \text{(Eqn. 4)}$$

where $\eta_i$ is the right normal vector to the speed vector of the agent I in the plane of operation (i.e., either on the ground or in the flight plane), and $f(x,\eta)$ is the directional sensitivity function of the antenna 30, 32, where x is the vector from the antenna 30, 32 to the source and $\eta$ is the direction of the highest sensitivity of the antenna 30, 32.

As shown, in the case of y=col, the summation for the left and right antenna 30, 32 signal intensity $L_i$ and $R_i$ respectively are taken only over those agents 620 j that satisfy $\|x_j - x_i\|_2 < \alpha$. This requires certain provisions in the modulation scheme that allow the agent to distinguish each collision avoidance beacon 38. In the case of the target attraction beacon 36, distinguishing between different agents 620 is not necessary and the above summation can, in some instance, actually be done by the antenna 36, 38 rather than in other digital hardware processors.

As noted above, the decision for a turn of direction requires the two directional antenna 30, 32 on each side of the agent 20 facing in substantially opposite directions ($\eta$ and $-\eta$), and generally perpendicular to the speed vector of the agent 20. Because the turning radius $\rho$ of the agent 20 is assumed independent of the direction, a simple intensity comparison between the left and right directional antenna 30, 32 will allow the agent 20 to determine a new heading. Accordingly, the agent 20 will determine the intensity sum and difference between the antenna 30, 32 (block 415). The intensity sum and difference of the signal intensity for the antennas 30, 32, (i.e., left and right antenna) is shown in Equation (5) as:

$$L_{y,i} + R_{y,i} = S_{y,i}$$

$$L_{y,i} - R_{y,i} = D_{y,i}$$

$$y \in \{col, tar\}$$

$$i = 1, \ldots n \quad \text{(Eqn. 5)}$$

where $S_{y,i}$ denotes the sum of the left and right antenna 30, 32 signal strength and $D_{y,i}$ denotes the difference of the left and right antenna 30, 32 signal strength of modality y at agent 20 i.

The guidance of the agent 20 then determines if the agent 20 should change direction (block 325). For instance, the example agent 20 first determines if the sum of the left and right signal strength $S_{col,i}$ of the detected collision avoidance beacon 38 is greater than zero (block 420). If the sum of the left and right signal strength $S_{col,i}$ is greater than zero, then the example agent 20 determines if the difference of the left and right signal strength $D_{col,i}$ of the detected collision avoidance beacon 38 is greater than zero (block 425). If the difference of the left and right signal strength $D_{col,i}$ is greater than zero, then the agent 20 turns right (block 430). If, however, the difference of the left and right signal strength $D_{col,i}$ is not greater than zero, then the agent 20 turns left (block 435).

If the agent 20 determines that the sum of the left and right signal strength $S_{col,i}$ is not greater than zero (block 420), then the example agent 20 determines if the sum of the left and right strength $S_{tar,i}$ of the detected target attraction beacon 36 is greater than a predetermined threshold (block 440). The threshold may be any suitable value, adjusting for the desired sensitivity of the agent 20. If the sum of the left and right strength $S_{tar,i}$ of the detected target attraction beacon 36 is not greater than the threshold, then the agent 20 does not change direction and process control return to block 310. If, however, the sum of the left and right strength $S_{tar,i}$ of the detected target attraction beacon 36 is greater than the threshold, then the example agent 20 determines if the difference of the left and right signal strength $D_{tar,i}$ of the detected target attraction beacon 36 is greater than zero (block 445). If the difference of the left and right signal strength $D_{tar,i}$ is greater than zero, then the agent 20 turns left (block 435). If, however, the difference of the left and right signal strength $D_{tar,i}$ is not greater than zero, then the agent 20 turns right (block 430). After any turn in direction, process control returns to block 310.

In another form, the decision for turn direction can be represented by Algorithm (1) as:

(Algorithm 1)

```
If S_col,i > 0 then
    if D_col,i > 0 then
        turn right
    else
        turn left
    end if
else if S_tar,i > threshold then
    if D_tar,i > 0 then
        turn left
    else
        turn right
    end if
else
    maintain course
end if
```

The possible advantages of the proposed navigational system are many. In one instance, the guiding principle is extremely simple and involves only local beacon-based interactions ("emergent behavior"). The principle of the system scale because the scheme can be implemented in analog form if necessary. The underlying beacon-based mechanisms make the entire system extremely robust to individual agent 20 failure, and the performance of the whole system degrades gracefully with a decreasing number of agents 20.

Additionally, the navigation principle provides simple and coarse performance prediction of the entire swarm in a stochastic sense (rather than each individual agent 20) even in cases of heterogeneous networks with different types of agents 20.

The principle provides many special application systems for intelligence, surveillance, reconnaissance, target tracking and interception by simply changing the beacon detection radius and/or making certain agents 20 stationary: mobile sensor networks, multi-agent target detection and tracking, patrolling for fixed surveillance tasks, interception tasks for infra-structure protection, targeting, plume tracking, ad-hoc cellular communication service facilitation, etc.

Figure 6:
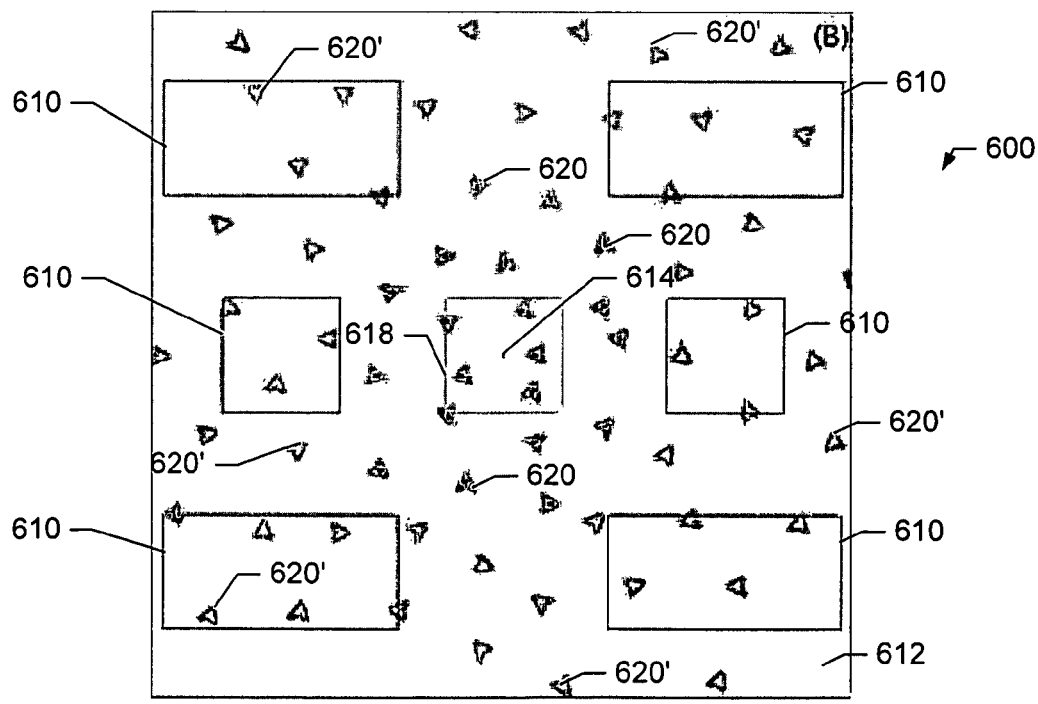
FIG. 6 is an illustration of another example swarm navigation system.

In one experiment swarm system 600 illustrated in FIG. 6, an agent-based simulation was conducted in an environment which consists of a parallelizable simulator and an experiment grid-server, which can be used to schedule experiments on heterogeneous clusters of computers, automatically parallelize and distribute simulations over multiple hosts, collect statistics, and perform preliminary data analysis In the experiments an environment was modeled, in which two types of small structures 610 (e.g., tents of size 5 m×10 m and 5 m×5 m) were placed in an area 612. A target 614 (5 m×5 m), which was to be protected by the agents 20, was placed in the center of a target area 618. The simulation included a plurality of friendly agents 620 and a plurality of intruder agents 620'. The target 614 could be detected by friendly agents 620 within a radius of 15 m. Detection of the target 614 caused friendly agents 620 to turn on their target attraction beacons 36.

The example friendly agents 620 have a circular destruction range rf=1 m (i.e., a diameter of 2 m, which is the same as their size o). Their repulsion range $\rho$ was varied from 6 m to 14 m and their speed was co-varied from 3 m/s (i.e., 10.8 km/hr) to 21 m/s (i.e., 75.6 km/hr) to account for the relation between speed and minimum turning radius $\tau$ (on which $\rho$ depends) in different simulations. Within each simulation, the speed was constant. The control algorithm employed in friendly agents 620 was the one described above for all simulations.

The example intruder agents 620' also had the same size (2 m), but their speed was 300 m/s (i.e., 1080 km/hr) in all simulations. Different from the friendly agents 620, the intruder agents 620' had the ability to sense all agents 620 and 620' (e.g., via radar), and moreover, they knew at all times where the target 618 was (e.g., via GPS). To avoid collisions, the intruder agents 620 used a potential-based control, which computed a "repulsive force" for each sensed friendly agent 620 and an attractive force for the location of the target 618, both of which drop off with the square of the distance $c/r^2$, where c is a scaling constant (c=100 for the target 618 and c=−10 for the friendly agents 620).

In all example simulations described herein, there were $\eta_f$=90 agents 620. Initially, all the agents 620 were placed randomly above the area 612. All simulations were run either until the target 614 was destroyed by an intruder agent 620', or, if the target 614 was not destroyed, for up to 1,000,000 simulation cycles, where one cycle corresponds to 100 ms (i.e., for a total of about 24 hrs). All results were averaged over 100 different initial conditions of random placements of friendly agents 620. After the first 500 cycles, during which the swarm system 600 was allowed to form a tight pattern over the target structure, a new intruder was added to the simulation, regardless of whether other intruders were still present, approaching from a distance of $\tau_h$=100 from the west.

A set of systematic "parameter sweep" experiments were first conducted to determine the relations among different parameter settings for the swarm system 600, and in particular, the speed ratio $v_f/v_h$. Where $v_f$ is the velocity of the friendly agents 620, and $v_h$ is the velocity of the intruder agents 620'. Note that because agents 620 that intercept the intruder agents 620' and consequently get destroyed are not replaced in these simulations, the number of friendly agents 620 will continue to drop as time goes on. Eventually, there will not be enough friendly agents 620 left to provide sufficient coverage of the area 612 and the intruder agents 620' will be able to destroy the target 614. Because it would be expected that the best configurations will last the longest, a "time target destruction" can be used as a performance measure of the swarm system 600.

Figure 7A:
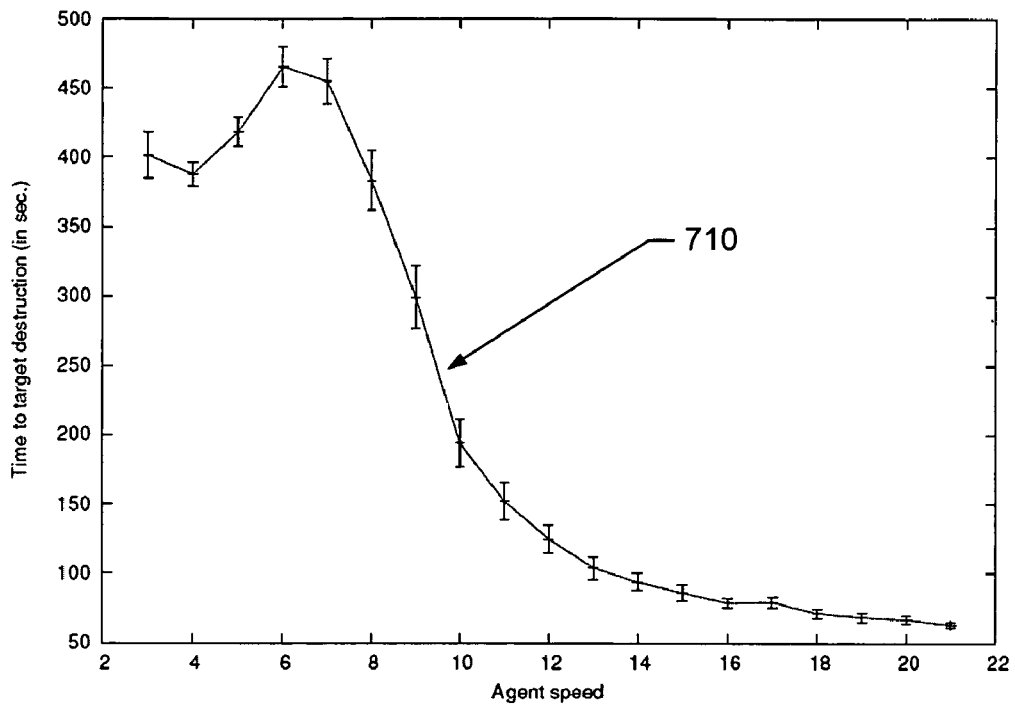
FIG. 7A is a graph showing the example simulation results including the predicted time to target destruction for the example swarm navigation system of FIG. 6.
Figure 7B:
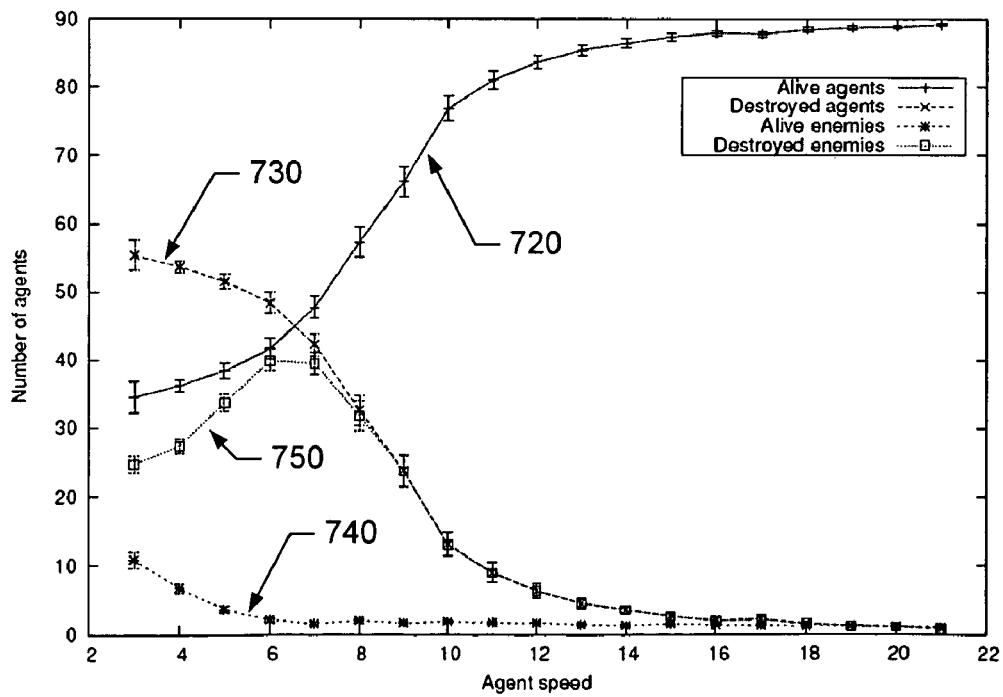
FIG. 7B is a graph showing the example simulation results including the number of agents for the example swarm navigation system of FIG. 6.

A graphical representation of the results of the experiment can be seen in FIGS. 7A and 7B. FIG. 7A is a graph showing the example simulation results including the predicted time to target destruction (line 710) for the example swarm system 600 with varying the speed of the agents 620. FIG. 7B is a graph showing the example simulation results including the number of alive friendly agents 620 (line 720) the number of destroyed friendly agents 620 (line 730) the number of alive intruder agents 620' (line 740) and the number of destroyed alive intruder agents 620' (line 750) with varying speed of the agents 620. The repulsion ranges $\rho$ varying with the speed of the agent.

As illustrated, lower-speed systems with lower repulsion radii last much longer before the target 614 is destroyed than higher speed systems with higher repulsion radii. This is due to the tighter coverage of the area 612, which makes it more difficult for the intruder agents 620' to navigate through the friendly agents 620 without crashing into them. The best configuration with speed $v_f$=6 m/s (i.e., ratio $v_f/v_h$=1/50) and repulsion range $\rho$=7.33 m lasted for almost 8 min on average, destroying almost 40 intruders (note that there was a difference between the number of destroyed intruder agents 620' (48.36) and the number of destroyed friendly agents 620 (39.92), due to the fact that sometimes the same friendly agent 620 destroyed two intruder agents 620' at the same time.

To determine how well systems (like the above with $v_f$=6 m/s) perform under more realistic assumptions of replenishments of destroyed friendly agents 620, another set of experiments was conducted for three systems with $v_f \in \{6$ m/s, 7 m/s, 8 m/s$\}$ and the corresponding values for $\rho$ as depicted in FIGS. 7A and 7B. In these experiments, a new friendly agent 620 was added to the swarm system 600 at a random location within the area 612 for each intruder agent 620' that was destroyed.

The results obtained for all three conditions indicated that: no friendly agent 620 collided with another friendly agent 620 in any run; no intruder agent 620' was able to destroy the target 614 in any run; all 9,995 intruder agents 620' were destroyed; and the number of alive friendly agents 620' at the end of each 1 million cycle run was higher than the original number because sometimes two intruder agents 620' collided at the same time with the same friendly agent 620. The average number of excess alive friendly agents 620 at the end of the simulations were 26.9 for 6 m/s, 63.7 for 7 m/s, and 99.11 for 8 m/s.

In other examples, each of the agents 20 within the swarm may be modified for specific purposes. For instance, in one example, a homogeneous swarm of agents 20 with identical navigation rules and sensing capabilities may be implemented. In another example, a heterogeneous swarm of agents 20 may be implemented. In this instance, heterogeneity may come from either the navigation parameters (e.g. repel radius) or the sensing capabilities of the agents 20. Still further differing processing and/or fusion algorithms may be utilized.

In another example, the plurality of agents 20 may include a leader agent 20, or units, and a plurality of follower agents 20. In this example, the leader agent 20 activates its target attraction beacon 36 and the follower agents 20 follow the designated leader, while maintaining their proper operating distance via the active collision avoidance beacons 38. A single leader agent 20 or multiple leader agents 20 may be utilized. Still further, the system may allow the capability of generating additional leader agents 20 during operations.

In still another example, a multi-leader multi-swarm system may be utilized, wherein each of a plurality of leader agents 20 has assigned to it a set of low level follower agents 20 that respond to the specific leader agent 20. In this example, the different leader agents 20 may compete with and/or collaborate with other leader agents 20.

In another example, a multi-layer hierarchical swarm may be utilized. In this example, a swarm agent 20 may be both a follower agent 20 (with respect to a higher level leader agent 20), and a leader agent 20 (with respect to lower level follower agents 20) at the same time.

In yet another example, the swarm system may include at least one waypoint, or navigation beacon. In this instance, a linear waypoint configuration may be utilized to guide the swarm, and more particularly, leader agents along a path to the area of interest, e.g., the waypoints selectively attract the agents to navigate the agents to the proper location. Additionally, a convex hull of operation may be implemented, wherein the waypoints form an n-point polygon the interior of which is of interest for sensing. Further, a floating swarm without any waypoints (e.g. for tracking contaminants in the air), may be implemented.

In yet another example, a swarm may be utilized wherein the navigation is locally controlled by signal sources other than the radio beacons described herein. For instance, a mix of signal modalities may be used in the same way as the stereo radio receivers use the beacon signal to navigate. In such an implementation, local navigation of the agents 20 may be controlled by sound, infrared, light, magnetic fields, and/or any other suitable paradigm.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An apparatus for swarm navigation comprising:
a mobile agent;
a receiver operatively coupled to the mobile agent and capable of receiving a collision avoidance signal or a target attraction signal from a remote source using a stereo antenna pair; and
a memory storing instructions on a machine readable medium that when executed cause the mobile agent to determine the intensity and direction of the received collision avoidance signal or the received target attraction signal and to navigate substantially towards the received target attraction signal and substantially away from the received collision avoidance signal.

2. An apparatus as defined in claim 1, further comprising a collision avoidance beacon mounted to the mobile agent and adapted to broadcast a collision avoidance signal.

3. An apparatus as defined in claim 2, wherein the collision avoidance beacon is adapted to essentially continuously broadcast the collision avoidance signal.

4. An apparatus as defined in claim 2, further comprising a target attraction beacon mounted to the mobile agent and adapted to selectively broadcast a target attraction signal.

5. An apparatus as defined in claim 4, further comprising a target acquisition device operatively coupled to the target attraction beacon to selectively cause the target attraction beacon to broadcast the target attraction signal in response to an acquired target.

6. An apparatus as defined in claim 1, Wherein the controller determines the approximate location of the received collision avoidance signal or the target attraction signal by the equation:

$$I_{y,i} = \sum_{j=1}^{n} A_y / (\|x_j - x_i\|_2^2)$$

where $I_{y,i}$ is the power of the received collision avoidance signal or the target attraction signal;
y is the type of the received collision avoidance signal or the target attraction signal;
i is the identity of the source of the received collision avoidance signal or the target attraction signal;
$x_i$ is the location;
$A_y$ is the transmit power of the source of the received collision avoidance signal or the target attraction signal; and
n is the number of agents broadcasting.

7. An apparatus as defined in claim further comprising at least two receivers mounted to the mobile agent at substantially opposite locations, and wherein the controller determines the intensity of the received collision avoidance signal or the target attraction signal at each antenna by the equations:

$$R_{y,i} = \sum_{j \in \tau_y} A_y f(x_j - x_i, \eta_i) / (\|x_j - x_i\|_2^2), \text{ and}$$

$$L_{y,i} = \sum_{j \in \tau_y} A_y f(x_j - x_i, -\eta_i) / (\|x_j - x_i\|_2^2);$$

wherein $\eta_i$ is a right normal vector to a speed vector of the agent I;
$f(x,\eta)$ is a directional sensitivity function of the receiver;
x is a vector from the receiver to the source; and
$\eta$ is a direction of the highest sensitivity of the receiver.

8. A swarm navigation system comprising:
a plurality of mobile agents, each mobile agent comprising:
a receiver operatively coupled to the mobile agent and capable of receiving a collision avoidance signal or a target attraction signal from a remote source; and
a memory storing instructions on a machine readable medium that when executed cause the mobile agent to determine the intensity and direction of the received collision avoidance signal or the received target attraction signal and to navigate the mobile agent substantially towards the received target attraction signal and substantially away from the received collision avoidance signal;
a collision avoidance beacon mounted to the mobile agent and adapted to broadcast a collision avoidance signal; and
a target attraction beacon mounted to the mobile agent and adapted to selectively broadcast a target attraction signal.

9. A system as defined in claim 8, wherein the collision avoidance beacon is adapted to essentially continuously broadcast the collision avoidance signal.

10. A system as defined in claim 8, wherein the instructions stored in the memory of each mobile agent comprises identical instructions to navigate the mobile agent.

11. A system as defined in claim 8, wherein the instructions stored in the memory of each mobile agent to navigate the mobile agent are not identical.

12. A system as defined in claim 8, wherein at least one of the plurality of mobile agents essentially continuously broadcasts a target attraction signal.

13. A system as defined in claim 8, wherein the plurality of mobile agents are sorted into at least two subsets, and wherein at least one of the plurality of mobile agents in each subset broadcasts a target attraction signal, and wherein the remaining plurality of mobile agents in each subset navigate toward the target attraction signal of the at least one of the plurality of mobile agents in the same subset.

14. A system as defined in claim 13, wherein each of the plurality of mobile agents in each subset that broadcasts a target attraction signal further comprises a communication device allowing each of the plurality of mobile agents to communicate with one another.

15. A system as defined in claim 13, Wherein at least one of the remaining plurality of mobile agents in each subset broadcasts a target attraction signal, and Wherein the remaining mobile agents in each subset navigate toward each of the broadcasted target attraction signal of the plurality of mobile agents in the same subset.

16. A system as defined in claim 8, further comprising at least one navigation waypoint to broadcast a navigation signal.

17. A system as defined in claim 16, wherein at least one of the mobile agents further comprises instructions that when executed cause the mobile agent to receive the broadcasted navigation signal and to navigate the mobile agent substantially towards the received navigation signal.

18. A system as defined in claim 16, wherein a plurality a navigation, waypoints are generally linearly arranged.

19. A system as defined in claim 8, wherein the remote source is another mobile agent within the system.

20. A system as defined in claim 8, wherein the collision avoidance signal includes at least one of sound, infrared, light, or a magnetic field.

21. A system as defined in claim 8, wherein the target attraction signal includes at least one of sound, infrared, light, or a magnetic field.

* * * * *